(12) United States Patent
Zhang et al.

(10) Patent No.: US 12,040,667 B2
(45) Date of Patent: Jul. 16, 2024

(54) SALIENT POLE TYPE HYBRID EXCITATION MOTOR

(71) Applicants: ZHEJIANG GEELY HOLDING GROUP CO., LTD, Zhejiang (CN); WUXI INFIMOTION TECHNOLOGY CO., LTD, Jiangsu (CN)

(72) Inventors: Shengchuan Zhang, Hangzhou (CN); Xuebo Xiong, Hangzhou (CN); Liang Fang, Hangzhou (CN); Tao Han, Hangzhou (CN); Haisheng Yu, Hangzhou (CN); Yanjun Tan, Hangzhou (CN); Xiaozhe Lin, Hangzhou (CN); Ruiping Wang, Hangzhou (CN); Ingo Scholten, Hangzhou (CN)

(73) Assignee: WUXI INFIMOTION TECHNOLOGY CO., LTD, Jiangsu (CN)

( * ) Notice: Subject to any disclaimer, the term of this patent is extended or adjusted under 35 U.S.C. 154(b) by 138 days.

(21) Appl. No.: 17/802,668

(22) PCT Filed: Feb. 23, 2022

(86) PCT No.: PCT/CN2022/077377
§ 371 (c)(1),
(2) Date: Aug. 26, 2022

(87) PCT Pub. No.: WO2022/105947
PCT Pub. Date: May 27, 2022

(65) Prior Publication Data
US 2023/0231453 A1    Jul. 20, 2023

(30) Foreign Application Priority Data
Jan. 14, 2022 (CN) .......................... 202210042232.8

(51) Int. Cl.
*H02K 16/02* (2006.01)
*H02K 1/12* (2006.01)
(Continued)

(52) U.S. Cl.
CPC ............... *H02K 16/02* (2013.01); *H02K 1/12* (2013.01); *H02K 1/24* (2013.01); *H02K 1/2733* (2013.01); *H02K 5/15* (2013.01); *H02K 2201/03* (2013.01)

(58) Field of Classification Search
CPC . Y02T 10/64; H02K 1/12; H02K 1/24; H02K 1/246; H02K 1/2733; H02K 1/2766;
(Continued)

(56) References Cited

U.S. PATENT DOCUMENTS 7,671,494 B2   3/2010   Shibukawa
9,013,082 B2   4/2015   Ge et al.
(Continued)

FOREIGN PATENT DOCUMENTS

CN    1325172 A    12/2001
CN    1388625 A     1/2003
(Continued)

OTHER PUBLICATIONS

EP-2270957-A1, Tomigashi H, all pages (Year: 2011).*
(Continued)

*Primary Examiner* — Naishadh N Desai
(74) *Attorney, Agent, or Firm* — Westbridge IP LLC

(57) ABSTRACT

A salient pole type hybrid excitation motor, belonging to the field of motors, and including a rotor assembly, where the rotor assembly includes: an electromagnetic rotor with radial salient poles and constructed in an annular shape and (Continued)

sleeving a magnetic yoke; a permanent magnet rotor installed on one side of the electromagnetic rotor; and axial salient pole blocks installed on one side of the permanent magnet rotor away from the electromagnetic rotor and arranged alternately with the radial salient poles, a plurality of axial salient pole blocks being matched with a plurality of radial salient poles of the electromagnetic rotor, and a polarity of the permanent magnet steels corresponding to the axial salient pole blocks being opposite to that of permanent magnet steels corresponding to the radial salient poles of the electromagnetic rotor. The present invention combines electric excitation and permanent magnet excitation to adjust an air gap magnetic field of a motor.

12 Claims, 4 Drawing Sheets

(51) Int. Cl.
   *H02K 1/24* (2006.01)
   *H02K 1/2733* (2022.01)
   *H02K 5/15* (2006.01)

(58) Field of Classification Search
   CPC .. H02K 16/02; H02K 21/046; H02K 2201/03; H02K 5/15; H02K 1/276; H02K 11/00; H02K 3/46
   See application file for complete search history.

(56) References Cited

U.S. PATENT DOCUMENTS

| | | |
|---|---|---|
| 9,515,524 B2 | 12/2016 | Shibata |
| 2002/0175583 A1 | 11/2002 | Kikuchi et al. |
| 2009/0121571 A1* | 5/2009 | Onuma ................. H02K 21/00 310/90.5 |

FOREIGN PATENT DOCUMENTS

| | | |
|---|---|---|
| CN | 101022226 A | 8/2007 |
| CN | 101227130 A | 7/2008 |
| CN | 102315739 A | 1/2012 |
| CN | 102487234 A | 6/2012 |
| CN | 103580335 A | 2/2014 |
| CN | 105680649 A | 6/2016 |
| CN | 205681195 U | 11/2016 |
| CN | 110061603 A | 6/2019 |
| EP | 2270957 A1 * | 1/2011 ............. H02K 1/276 |
| EP | 2270957 A1 | 1/2011 |
| WO | WO-2018/037903 A1 | 3/2018 |

OTHER PUBLICATIONS

1st Office Action for China Patent Application No. 202210042232.8 dated May 31, 2023 (8 pages).
1st Office Action for EP Patent Application No. 22724395.3 dated Aug. 21, 2023 (8 pages).
International Search Report and Written Opinion for PCT/CN2022/077377 (ISA/CN) dated Jul. 27, 2022 (8 pages).

* cited by examiner

SALIENT POLE TYPE HYBRID EXCITATION MOTOR

CROSS-REFERENCE TO RELATED APPLICATIONS

This application is a national phase entry of International Application No. PCT/CN2022/077377, filed Feb. 23, 2022, which claims priority to Chinese Application No. 202210042232.8, filed Jan. 14, 2022, the entire contents of which are each incorporated herein by reference.

FIELD OF THE INVENTION

The present invention relates to the field of motors, and in particular to a salient pole type hybrid excitation motor.

BACKGROUND OF THE INVENTION

A permanent magnet motor attracts more and more attention due to the characteristics of high torque density, high efficiency, light weight and miniaturization, and has been widely used in various fields. However, the air gap magnetic field of the permanent magnet motor is determined by the magnetic conductance of a permanent magnet steel and a magnetic circuit, and is almost constant and difficult to adjust, which limits the further development and application of the permanent magnet motor.

Compared with the permanent magnet motor, an electric excitation motor has the advantages of simple control, anti-vibration and easy assembly. The magnetic field intensity can be controlled by controlling an excitation current, so that a purpose of speed adjustment can be achieved, which is also a unique advantage of the (direct current) excitation motor. The excitation motor is controlled by high technology, high in reliability, and generally used in a high-power occasion. However, the excitation motor has a complex structure and a strict production process, cannot be small, energy-saving and easy to operate, and has disadvantages in energy-saving effect and production cost.

A hybrid excitation motor not only has the high efficiency, high power density and many other characteristics of the permanent magnet motor, but also has the advantage of the electric excitation motor that the air gap magnetic field of the motor is smooth and adjustable. In an electric operation, the hybrid excitation motor has the advantages of large starting torque and wide speed adjustment range; and in a power generation operation, the hybrid excitation motor has a wide voltage regulation capability or a wide range variable-speed constant-voltage output capability. Due to the advantages of adjustable magnetic field, high torque density and high efficiency, the hybrid excitation motor is especially suitable for occasions such as constant power, wide speed regulation drive and constant voltage power generation, and has broad application prospects in fields such as aerospace, wind power generation, and electric vehicles. However, at present, there are only a few types of hybrid excitation motors and an application range thereof is limited, and therefore, a hybrid excitation motor needs to be provided to expand the application range of the hybrid excitation motor.

BRIEF DESCRIPTION OF THE INVENTION

An object of the present invention is to provide a salient pole type hybrid excitation motor, so as to expand an application range of the hybrid excitation motor and to make an air gap magnetic field of the motor adjustable.

The present invention provides a salient pole type hybrid excitation motor, including a rotor assembly, the rotor assembly including:
a magnetic yoke;
an electromagnetic rotor constructed in an annular shape and sleeving the magnetic yoke, the electromagnetic rotor being provided with, at intervals on an annular peripheral surface thereof, a plurality of radial salient poles projecting radially;
at least one set of permanent magnet rotor sleeving the magnetic yoke and arranged on one side of the electromagnetic rotor, each set of the permanent magnet rotor including:
a permanent magnet rotor core constructed in an annular shape and sleeving the magnetic yoke, a plurality of permanent magnet steels being installed on the permanent magnet rotor core, and a plurality of spaced positioning slots being arranged on the permanent magnet rotor core; and
a plurality of axial salient pole blocks corresponding to the plurality of radial salient poles of the electromagnetic rotor and installed on an outer side of the permanent magnet rotor core, the axial salient pole blocks being arranged alternately with the plurality of radial salient poles of the electromagnetic rotor, the plurality of axial salient pole blocks being matched with the plurality of radial salient poles of the electromagnetic rotor, and a polarity of the permanent magnet steels corresponding to the axial salient pole blocks being opposite to that of the permanent magnet steels corresponding to the radial salient poles of the electromagnetic rotor.

Further, the salient pole type hybrid excitation motor includes two sets of the permanent magnet rotors and two groups of the axial salient pole blocks, the two sets of the permanent magnet rotors sleeving the magnetic yoke and being arranged on two sides of the electromagnetic rotor respectively, and the two groups of the axial salient pole blocks being arranged on the other end portion of the two sets of the permanent magnet rotors respectively.

Further, one end of the permanent magnet rotor core close to the axial salient pole blocks is provided with a plurality of spaced positioning slots, the quantity of the axial salient pole blocks on a single side is the same as that of the positioning slots, the axial salient pole blocks are installed corresponding to the positioning slots, and at least part of each of the axial salient pole blocks is located in each of the positioning slots; the permanent magnet rotor core is provided with through holes used to install the permanent magnet steels, and the positioning slots are located between an peripheral surface of the permanent magnet rotor core and the through holes.

Further, the quantity of the radial salient poles and the quantity of the axial salient pole blocks on a single side are the same as the pole pair quantity of the permanent magnet rotors.

Further, the motor further includes end caps arranged at two ends of the rotor assembly, each of the end caps is provided with a magnetic conductive ring with a groove, and an excitation assembly is arranged in the groove.

Further, the excitation assembly includes an excitation coil and a coil bracket, the coil bracket being provided with a bracket slot for installing the excitation coil.

Further, a stator assembly includes a stator winding and a stator core, wherein a stator inner cavity includes a first inner cavity and a second inner cavity, the stator core surrounds and forms the first inner cavity, the stator winding surrounds and forms the second inner cavity, and the stator core provides support for the stator winding; in the axial direction of the stator assembly, the electromagnetic rotor and at least part of the permanent magnet rotors are located in the first inner cavity, and at least part of the excitation assemblies on at least a single side are located in the second inner cavity.

Further, each of the excitation assemblies does not exceed an axial outermost end of the stator winding, and an outermost end of the coil bracket does not exceed the axial outermost end of the stator winding.

Further, an axial end face of a radial outer portion of the magnetic conductive ring facing the rotor assembly is arranged opposite to an axial end face of the axial salient pole blocks, and a first axial auxiliary air gap exists therebetween.

Further, an axial end face of a radial inner portion of the magnetic conductive ring facing the rotor assembly is arranged opposite to an end face of the magnetic yoke, and a second axial auxiliary air gap exists therebetween.

Further, the radial salient poles of the electromagnetic rotor are N poles, the axial salient pole blocks are S poles, and the axial salient pole blocks are arranged opposite to an N pole of the permanent magnet.

The present invention changes the direction and magnitude of an electric excitation magnetic field in a case of power on by a combined action of electric excitation and permanent magnet excitation, so as to adjust an air gap magnetic field of a motor. According to the present invention, double salient poles of a rotor assembly are formed by axial salient pole blocks and radial salient poles of an electromagnetic rotor, so that not only the permanent magnet excitation but also electromagnetic excitation of the motor can be achieved. By combining the permanent magnet excitation with the electromagnetic excitation, a series of advantages of a permanent magnet motor can be inherited, and the magnetic field of the electric excitation motor can be smooth and adjustable, therefore an application range and use conditions of the motor are expanded.

The above and other objects, advantages and features of the present invention will become more apparent to those skilled in the art from the following detailed description of specific embodiments of the present invention in conjunction with the accompanying drawings.

BRIEF DESCRIPTION OF THE DRAWINGS

Hereinafter, some specific embodiments of the present invention will be described in detail in an illustrative rather than restrictive manner with reference to the accompanying drawings. The same reference signs in the drawings indicate the same or similar components or parts. Those skilled in the art should understand that these drawings are not necessarily drawn to scale. In the accompanying drawings.

Figure 1:
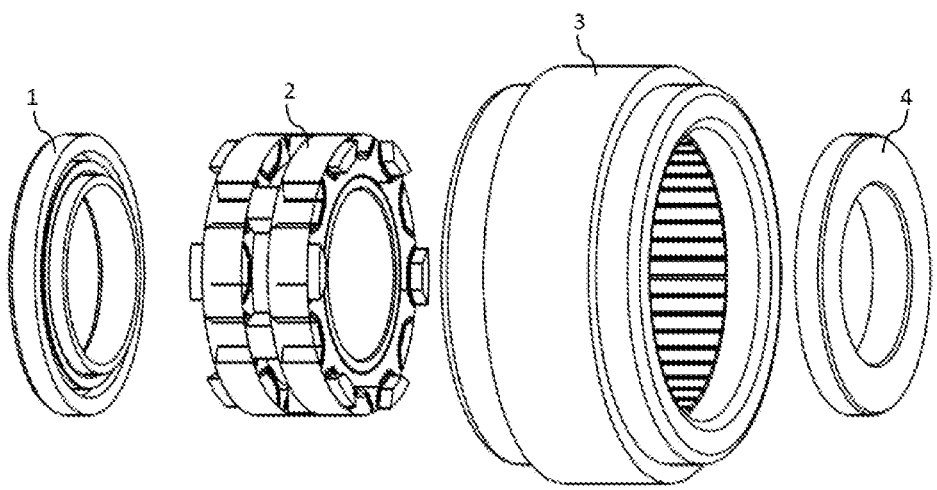
FIG. 1 is a structural exploded diagram of a double salient pole type hybrid excitation motor according to an embodiment of the present invention.

In the drawings: 1—first excitation assembly, 10—magnetic conductive ring, 11—excitation coil, 12—bracket slot, 13—bracket, 14—groove, 2—rotor assembly, 20—axial salient pole block, 21—permanent magnet rotor, 210—permanent magnet rotor core, 2101—positioning slot, 2102—through hole, 211—permanent magnet steel, 22—electromagnetic rotor, 220—radial salient pole, 23—magnetic yoke, 3—stator assembly, 30—stator winding, 31—stator core, 4—second excitation assembly, 5—first axial auxiliary air gap, 6—second axial auxiliary air gap, and 8—main air gap.

DETAILED DESCRIPTION

Figure 2:
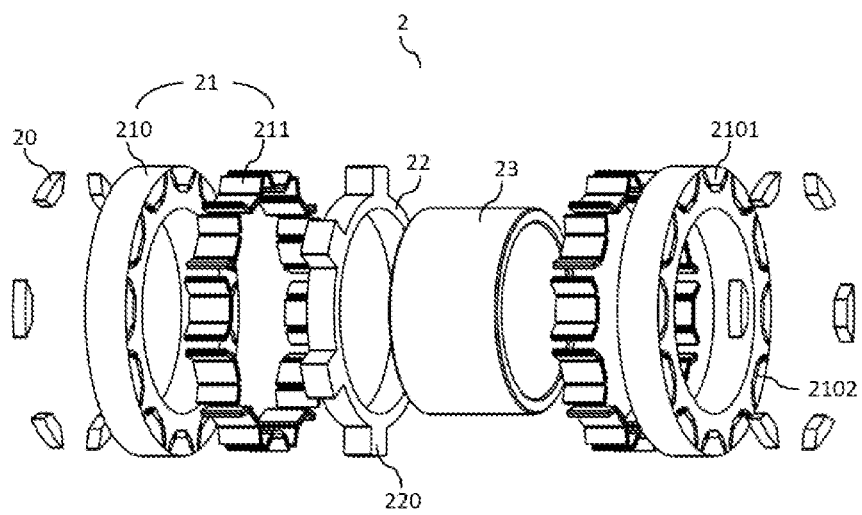
FIG. 2 is a structural exploded diagram of a rotor assembly of a double salient pole type hybrid excitation motor according to an embodiment of the present invention.

FIG. 1 is a structural exploded diagram of a double salient pole type hybrid excitation motor according to an embodiment of the present invention. FIG. 2 is a structural exploded diagram of a rotor assembly of a salient pole type hybrid excitation motor according to an embodiment of the present invention. In an embodiment, as shown in FIGS. 1 and 2, the present invention provides a salient pole type hybrid excitation motor, mainly including a first excitation assembly 1, a rotor assembly 2, a stator assembly 3 and a second excitation assembly 4. The rotor assembly 2 is installed in the stator assembly 3, and the first excitation assembly 1 and the second excitation assembly 4 sleeve two ends of the stator assembly 3 to provide electric excitation for the rotor assembly 2. Therefore, a motor air gap magnetic field of the hybrid excitation motor is smooth and adjustable. Certainly, in some embodiments, only one set of excitation assembly may be included, for example, only one of the first excitation assembly 1 and the second excitation assembly 4 is included, so that one of the first excitation assembly 1 and the second excitation assembly 4 is located at one of the two ends of the stator assembly 3, and the quantity of excitation assemblies corresponds to the quantity of permanent magnet rotors of the rotor assembly, for example, the quantity of excitation assemblies is the same as that of permanent magnet rotors of the rotor assembly.

The rotor assembly 2 mainly includes axial salient pole blocks 20, an electromagnetic rotor 22, permanent magnet rotors 21 and a magnetic yoke 23, where the electromagnetic rotor 22 is constructed in an annular shape and sleeves the magnetic yoke 23, a plurality of radial salient poles 220 projecting outward are arranged at intervals on an annular peripheral surface of the electromagnetic rotor 22, and the radial salient poles 220 extend in the radial direction of the rotor assembly. The permanent magnet rotors 21 sleeve the magnetic yoke 23. In the present embodiment, the quantity of the permanent magnet rotors 21 is two, and the two permanent magnet rotors 21 are arranged on two sides of the electromagnetic rotor 22 respectively and attached to the electromagnetic rotor 22; each of the permanent magnet rotors 21 includes a permanent magnet rotor core 210 and permanent magnet steels 211, and the permanent magnet steels 211 are inserted into through holes 2102 in the permanent magnet rotor core 210 and form the permanent magnet rotor 21 together with the permanent magnet rotor core 210; in addition, the permanent magnet rotor core 210 is further provided with a plurality of spaced positioning slots 2101 for installing the axial salient pole blocks 20; the salient pole blocks 20 extend in the radial direction of the rotor assembly, and the axial salient pole blocks 20 cooperate with the radial salient poles 220 on the electromagnetic rotor 22 to jointly construct the electromagnetic pole of the electromagnetic rotor 22, and the axial salient pole blocks 20 are axially aligned with grooves formed between the radial salient poles 220 to form a complete electromagnetic path.

In the present embodiment, double salient poles of the doubly rotor assembly 2 are formed by the axial salient pole blocks 20 and the radial salient poles 220 on the electromagnetic rotor 22, which realizes not only permanent magnet excitation but also electromagnetic excitation of the motor. By combining the permanent magnet excitation with the electromagnetic excitation, a series of advantages of a permanent magnet motor can be inherited, and the magnetic field of an electric excitation motor can be smooth and adjustable, therefore an application range and use conditions of the motor are expanded. In the present embodiment, the rotor assembly includes two permanent magnet rotors sharing one electromagnetic rotor 22, one end of the two permanent magnet rotors is in contact with the electromagnetic rotor, and the other end of the two permanent magnet rotors is provided with a group of axial salient pole blocks. In the present embodiment, the rotor assembly 2 has a triple salient pole structure, in which the radial salient poles 220 on the electromagnetic rotor 22 extend in the radial direction of the rotor assembly, and two groups of axial salient pole blocks extend in the axial direction of the rotor assembly.

Further, as the first excitation assembly 1 and the second excitation assembly 4 are arranged on end caps on two sides of the motor, without the need for a brush and a slip ring device, reliability and service life of the motor is further ensured.

In an embodiment, as shown in FIG. 2, the permanent magnet rotor core 210 of the permanent magnet rotor 21 is provided with a plurality of positioning slots 2101, and the shape of the positioning slots 2101 corresponds to that of the axial salient pole blocks 20. In addition, an outer portion of the positioning slots 2101 is provided with through holes 2102, and through the through holes 2102, the permanent magnet steels 211 are installed on the permanent magnet rotor core 210. The axial salient pole blocks 20 are installed on one side of the permanent magnet rotor core 210 away from the electromagnetic rotor 22, that is, an outer side of the permanent magnet rotor core 210.

It should be noted that, in the present embodiment, the shape of the permanent magnet steels 211 is not specific, and can be selected according to an actual situation, including but not limited to various structures such as I-shaped, V-shaped, double V-shaped, and U-shaped. Furthermore, the shape of the through holes 2102 is not specified, and can be matched with the permanent magnet steels 211.

In a further embodiment, as shown in FIG. 2, the quantity of the radial salient poles 220 of the electromagnetic rotor 22 is associated with the pole pair quantity of the permanent magnet rotors 21, and the quantity of the radial salient poles 220 is less than or equal to the pole pair quantity of the permanent magnet rotors 21. Since the radial salient poles 220 and the axial salient pole blocks 20 are matched with each other, the quantity of the radial salient poles 220 and the quantity of the axial salient pole blocks 20 on a single side are the same.

Figure 4:
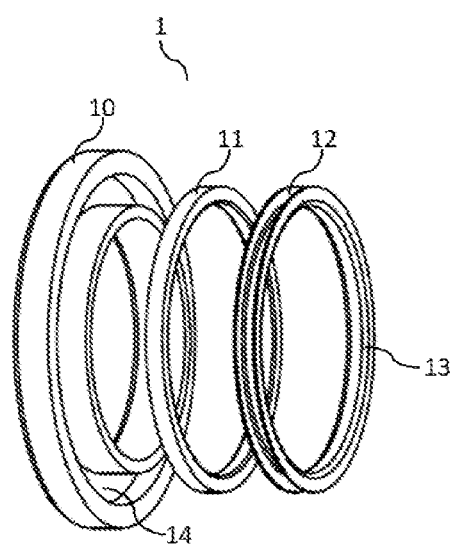
FIG. 4 is a structural exploded diagram of an excitation assembly of a double salient pole type hybrid excitation motor according to an embodiment of the present invention.
Figure 5:
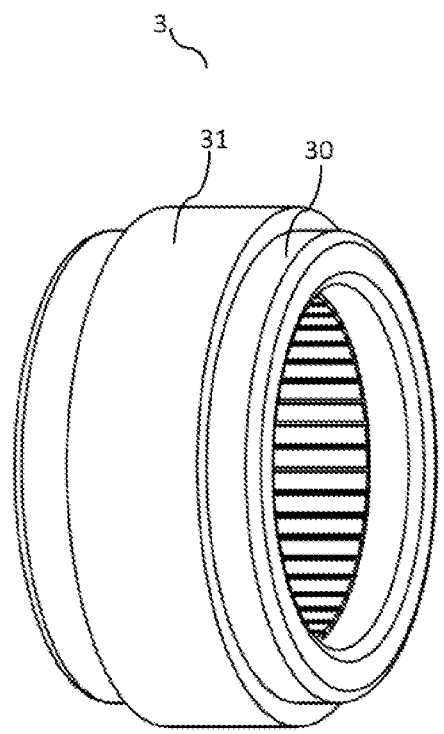
FIG. 5 is a structural schematic diagram of a stator assembly of a double salient pole type hybrid excitation motor according to an embodiment of the present invention.

In an embodiment, as shown in FIG. 4, two ends of the motor are provided with an end cap respectively, and each end cap is further provided with an excitation assembly. The present embodiment takes the first excitation assembly 1 as an example, and the first excitation assembly 1 mainly includes a magnetic conductive ring 10, an excitation coil 11 and a bracket 13. The bracket 13 is provided with a bracket slot 12 for installing the excitation coil 11. The magnetic conductive ring 10 is provided with a groove 14, so that the magnetic conductive ring 10 is divided into a radial outer portion located at the outer side of the groove 14 and a radial inner portion located at the inner side of the groove 14 in the radial direction. When the excitation coil 11 is installed in the bracket slot 12, the whole bracket 13 and the excitation coil 11 are placed in the groove 14, and finally, the first excitation assembly 1 is installed in the end cap and installed on one side of the rotor assembly 2.

The structure of the second excitation assembly 4 is the same as that of the first excitation assembly 1, so it is not described here. The second excitation assembly 4 and the first excitation assembly 1 are installed on two sides of the stator assembly 3, respectively, to provide electric excitation for the rotor assembly 2.

Figure 3:
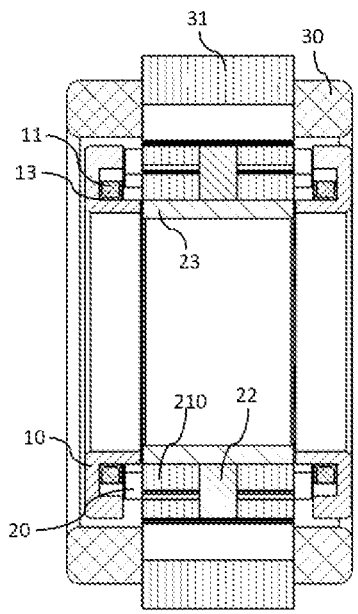
FIG. 3 is a structural cross-sectional diagram of a double salient pole type hybrid excitation motor according to an embodiment of the present invention.

Further, as shown in FIG. 3, the stator assembly 3 includes a stator core 31 and a stator winding 30. A stator inner cavity 32 is further formed in the stator assembly 3, and the stator inner cavity 32 includes a first inner cavity 321 and a second inner cavity 322, where the first inner cavity 321 is formed by being surrounded by the stator core 31, the second inner cavity 322 is formed by being surrounded by the stator winding 30, and the stator core 31 provides support for the stator winding 30. In the axial direction of the stator assembly 3, the electromagnetic rotor 22 and at least part of the permanent magnet rotors 21 are located in the first inner cavity 321, and at least a part of at least one excitation assembly of the first excitation assembly 1 and the second excitation assembly 4 is arranged inside the second inner cavity 322. In an implementation manner, the electromagnetic rotor 22 and the permanent magnet rotors 21 are located in the first inner cavity 321, the axial salient pole blocks 20 are located in the second inner cavity 322, and the first excitation assembly 1 and the second excitation assembly 4 are at least partially located in the second inner cavity 322.

In the present embodiment, by arranging the excitation assemblies on two sides of the rotor assembly 2, on the one hand, electric excitation is provided for the rotor assembly 2; on the other hand, a brush system and a slip ring device of a conventional motor are canceled, the reliability and the service life of the motor are improved, and maintenance cost of the motor is reduced. In addition, by using a compound salient pole structure combining the axial salient poles and the radial salient poles, and arranging two ends of the excitation assembly inside the stator assembly 3, a space under an end portion of the stator winding 30 is fully utilized, thus not only the overall volume of the motor is reduced, but also the power density and torque density of the motor are improved.

Further, the electromagnetic rotor 22 can be made by laminating silicon steel sheets or directly compression molding soft magnetic composite materials, with simple and convenient manufacturing and low cost; the magnetic yoke 23, the magnetic conductive ring 10 with the groove 14, and the axial salient pole blocks 20 are all made of the soft magnetic composite materials by directly compression molding, the manufacturing is also simple and convenient, and the cost is low. Moreover, the soft magnetic composite materials have low iron loss at a high frequency, which is conducive to improving the running efficiency at a high speed.

Further, as shown in FIG. 3, the radial outer portion of the magnetic conductive ring 10 corresponds to the height of the axial salient pole blocks 20, an axial end face of the radial outer portion of the magnetic conductive ring 10 facing the rotor assembly 2 is opposite to an axial end face of the axial salient pole blocks 20, and a first axial auxiliary air gap 5 exists therebetween.

Further, an axial end face of the radial inner portion of the magnetic conductive ring 10 facing the rotor assembly 2 is arranged opposite to an end face of the magnetic yoke 23, and a second axial auxiliary air gap 6 exists therebetween.

In the present embodiment, a complete magnetic path can be formed by the first axial auxiliary air gap 5 and the second axial auxiliary air gap 6.

In the present invention, for the convenience of explanation and understanding, the radial salient poles 220 correspond to N poles and the axial salient pole blocks 20 correspond to S poles.

Figure 7:
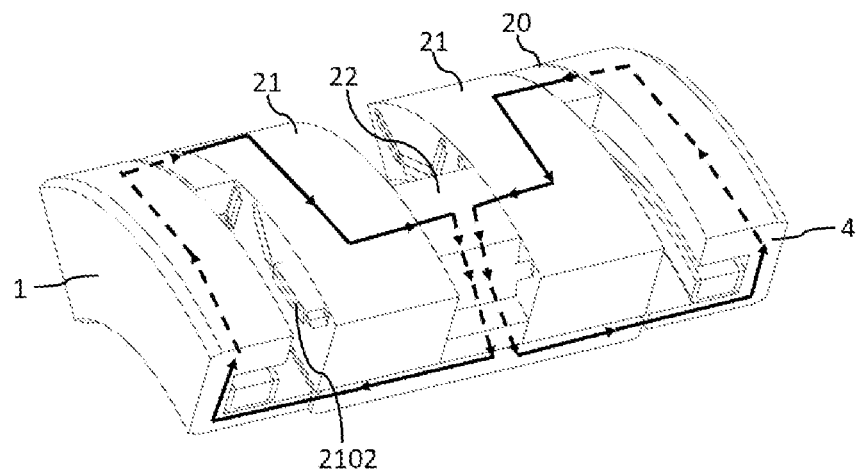
FIG. 7 is a structural schematic diagram of a magnetic path of a double salient pole type hybrid excitation motor according to an embodiment of the present invention.
Figure 8:
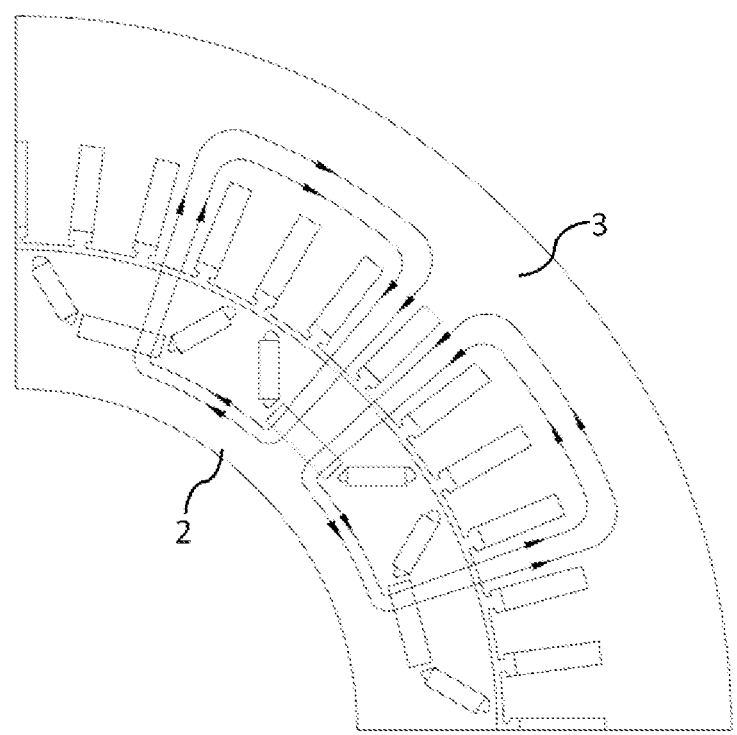
FIG. 8 is a side diagram of FIG. 7.

As shown in FIGS. 7 and 8, when the excitation winding coil 11 is not powered on, a part of magnetic flux generated by a permanent magnet steel 211 starts from an N pole of the permanent magnet steel, passes through a main air gap 8, a stator teeth, a stator yoke, an adjacent stator teeth and the main air gap 8, reaches an adjacent S pole, and then passes through the rotor yoke to form a magnetic circuit closed loop; a part of the magnetic flux starts from the N pole of the permanent magnet steel 211, passes through the electromagnetic rotor 22, the magnetic yoke 23, the second axial auxiliary air gap, the inner side of the magnetic conductive ring 10 with the groove 14, the outer side of the magnetic conductive ring 10 with the groove 14, the first axial auxiliary air gap and the axial salient pole block 20, reaches the adjacent S pole, and then passes through the rotor yoke to form a magnetic circuit closed loop. It can be seen that a first part of the magnetic circuit passes through the main air gap, and generates output torque externally; a second part of the magnetic circuit is closed through the auxiliary air gaps, but not through the main air gap, so it belongs to a leakage flux part and does not work externally.

Figure 6:
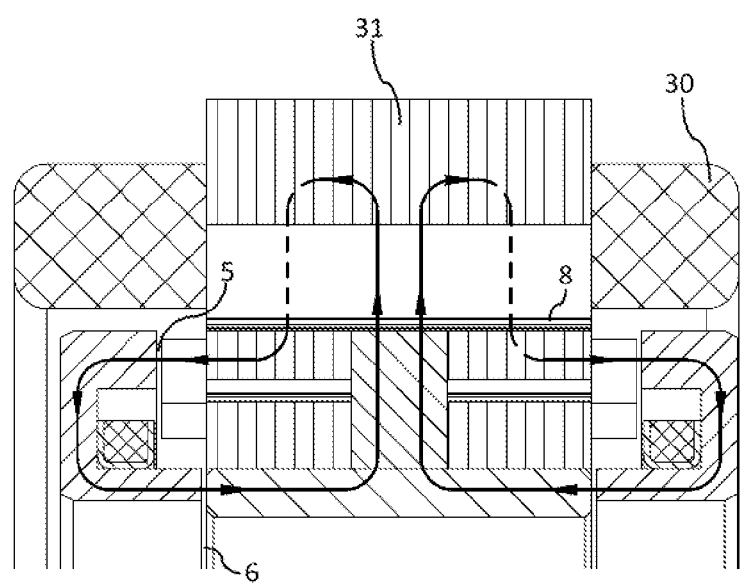
FIG. 6 is a partial enlarged diagram of FIG. 3.

As shown in FIGS. 6 and 8, it is magnetization when the excitation winding coil 11 is powered on and the radial salient pole 220 of the electromagnetic rotor 22 is an N pole, that is, the magnetic flux generated by the electric excitation passes through the second axial auxiliary air gap, the magnetic yoke 23, the radial salient pole 220 of the electromagnetic rotor 22, the main air gap 8, the stator teeth, the stator yoke, the stator teeth, the main air gap 8, the adjacent S pole, the axial salient pole block 20, the first axial auxiliary air gap 5, the outer side of the magnetic conductive ring 10 with the groove 14, and the inner side of the magnetic conductive ring 10 with the groove 14, to form a closed loop. At this time, the radial salient pole 220 of the electromagnetic rotor 22 is also an N pole, and in parallel with the N pole of the permanent magnet steel to output energy to the main air gap together.

As shown in FIGS. 6, 7 and 8, it is demagnetization when the excitation winding coil 11 is powered by a reverse current and the radial salient pole 220 of the electromagnetic rotor 22 is an S pole, that is, the magnetic flux generated by the N pole of the permanent magnet steel 211 passes through the radial salient pole 220 of the electromagnetic rotor 22, the magnetic yoke 23, the second axial auxiliary air gap, the inner side of the magnetic conductive ring 10 with the groove 14, the outer side of the magnetic conductive ring 10 with the groove 14, the first axial auxiliary air gap, the axial salient pole block 20, and the S pole of the permanent magnet rotor to form a closed loop through the rotor yoke, so that most of the magnetic flux of the permanent magnet steel 211 does not pass through the main air gap.

The adjustment of the main air gap magnetic field is achieved by powering on the excitation winding coil. According to the hybrid excitation motor with axial and radial compound salient poles, two excitation sources, namely permanent magnet steel excitation and exciting current excitation, are adopted, so that the adjustment and control of the air gap magnetic field are achieved. At a low speed, the exciting current provides magnetic assist, to improve the output torque at a low speed; and at a high speed, the exciting current provides weak magnetism, which is conducive to improving the running range of the motor, thereby achieving wide speed adjustment range.

Thus, it should be appreciated by those skilled in the art that while various exemplary embodiments of the present invention have been shown and described in detail herein, many other variations or modifications which are consistent with the principles of the present invention may be determined or derived directly from the disclosure of the present invention without departing from the spirit and scope of the present invention. Accordingly, the scope of the present invention should be understood and interpreted to cover all such other variations or modifications.

What is claimed is:

1. A salient pole type hybrid excitation motor, comprising a stator assembly and a rotor assembly, wherein the stator assembly has a stator inner cavity, and the rotor assembly is located in the stator inner cavity, the rotor assembly comprising:
   a magnetic yoke;
   an electromagnetic rotor constructed in an annular shape and sleeving the magnetic yoke, the electromagnetic rotor being provided with, at intervals on an annular peripheral surface thereof, a plurality of radial salient poles projecting radially;
   at least one set of permanent magnet rotor sleeving the magnetic yoke and arranged on one side of the electromagnetic rotor, each set of the permanent magnet rotor comprising:
   a permanent magnet rotor core constructed in an annular shape and sleeving the magnetic yoke, a plurality of permanent magnet steels being installed on the permanent magnet rotor core; and
   a plurality of axial salient pole blocks corresponding to the plurality of radial salient poles of the electromagnetic rotor and installed on an outer side of the permanent magnet rotor core, the axial salient pole blocks being arranged alternately with the plurality of radial salient poles of the electromagnetic rotor, the plurality of axial salient pole blocks being matched with the plurality of radial salient poles of the electromagnetic rotor, and a polarity of the permanent magnet steels corresponding to the axial salient pole blocks being opposite to that of the permanent magnet steels corresponding to the radial salient poles of the electromagnetic rotor.

2. The salient pole type hybrid excitation motor according to claim 1, wherein the salient pole type hybrid excitation motor comprises two sets of the permanent magnet rotors and two groups of the axial salient pole blocks, the two sets of the permanent magnet rotors sleeving the magnetic yoke and being arranged on two sides of the electromagnetic rotor respectively, and the two groups of the axial salient pole blocks being arranged on the other end portion of the two sets of the permanent magnet rotors respectively.

3. The salient pole type hybrid excitation motor according to claim 2, wherein one end of the permanent magnet rotor core close to the axial salient pole blocks is provided with a plurality of spaced positioning slots, the quantity of the axial salient pole blocks on a single side is the same as that of the positioning slots, the axial salient pole blocks are installed corresponding to the positioning slots, and at least part of each of the axial salient pole blocks is located in each of the positioning slots; the permanent magnet rotor core is provided with through holes used to install the permanent magnet steels, and the positioning slots are located between an peripheral surface of the permanent magnet rotor core and the through holes.

4. The salient pole type hybrid excitation motor according to claim 1, wherein the quantity of the radial salient poles and the quantity of the axial salient pole blocks on a single side are the same as the pole pair quantity of the permanent magnet rotors.

5. The salient pole type hybrid excitation motor according to claim 4, wherein the motor further comprises end caps arranged at two ends of the rotor assembly, each of the end caps is provided with a magnetic conductive ring with a groove, and an excitation assembly is arranged in the groove.

6. The salient pole type hybrid excitation motor according to claim 5, wherein the excitation assembly comprises an excitation coil and a coil bracket, and the coil bracket is provided with a bracket slot for installing the excitation coil.

7. The salient pole type hybrid excitation motor according to claim 5, wherein the stator assembly comprises a stator winding and a stator core, wherein the stator inner cavity comprises a first inner cavity and a second inner cavity, the stator core surrounds and forms the first inner cavity, and the stator winding surrounds and forms the second inner cavity, and the stator core provides support for the stator winding; in the axial direction of the stator assembly, the electromagnetic rotor and at least part of the permanent magnet rotors are located in the first inner cavity, and at least part of the excitation assemblies on at least a single side are located in the second inner cavity.

8. The salient pole type hybrid excitation motor according to claim 6, wherein each of the excitation assemblies does not exceed an axial outermost end of a stator winding, and an outermost end of the coil bracket does not exceed the axial outermost end of the stator winding.

9. The salient pole type hybrid excitation motor according to claim 6, wherein an axial end face of a radial outer portion of the magnetic conductive ring facing the rotor assembly is arranged opposite to an axial end face of the axial salient pole blocks, and a first axial auxiliary air gap exists therebetween.

10. The salient pole type hybrid excitation motor according to claim 8, wherein an axial end face of a radial inner portion of the magnetic conductive ring facing the rotor assembly is arranged opposite to an end face of the magnetic yoke, and a second axial auxiliary air gap exists therebetween.

11. The salient pole type hybrid excitation motor according to claim 9, wherein the radial salient poles of the electromagnetic rotor are N poles, the axial salient pole blocks are S poles, and the axial salient pole blocks are arranged opposite to an N pole of the permanent magnet.

12. The salient pole type hybrid excitation motor according to claim 10, wherein the radial salient poles of the electromagnetic rotor are N poles, the axial salient pole blocks are S poles, and the axial salient pole blocks are arranged opposite to an N pole of the permanent magnet.

* * * * *